(12) United States Patent
Kim et al.

(10) Patent No.: US 12,533,174 B2
(45) Date of Patent: Jan. 27, 2026

(54) HIGH-FREQUENCY ENERGY TRANSFER DEVICE

(71) Applicant: WON TECH CO., LTD., Daejeon (KR)

(72) Inventors: Jung Hyun Kim, Seongnam-si (KR); Young Seok Seo, Sejong-si (KR); Young Sik Kim, Daejeon (KR); Se Jong Kim, Daejeon (KR)

(73) Assignee: WON TECH CO., LTD., Daejeon (KR)

( * ) Notice: Subject to any disclaimer, the term of this patent is extended or adjusted under 35 U.S.C. 154(b) by 467 days.

(21) Appl. No.: 17/928,362

(22) PCT Filed: Jul. 21, 2021

(86) PCT No.: PCT/KR2021/009718
§ 371 (c)(1),
(2) Date: Nov. 29, 2022

(87) PCT Pub. No.: WO2022/025592
PCT Pub. Date: Feb. 3, 2022

(65) Prior Publication Data
US 2023/0210581 A1    Jul. 6, 2023

(30) Foreign Application Priority Data
Jul. 28, 2020 (KR) .................. 10-2020-0093474

(51) Int. Cl.
*A61B 18/14* (2006.01)
*A61B 18/12* (2006.01)
(Continued)

(52) U.S. Cl.
CPC .......... *A61B 18/14* (2013.01); *A61B 18/1206* (2013.01); *A61N 1/06* (2013.01);
(Continued)

(58) Field of Classification Search
CPC .......... A61N 1/328; A61N 1/06; A61N 1/403; A61N 1/0492; A61B 2018/0047
See application file for complete search history.

(56) References Cited

U.S. PATENT DOCUMENTS 4,736,752 A * 4/1988 Munck ................ A61N 1/0456
607/152
2014/0188099 A1* 7/2014 Przybyszewski ...... A61B 18/14
606/41
(Continued)

FOREIGN PATENT DOCUMENTS

JP    2017-213420 A    12/2017
KR    10-2004-0093706 A    11/2004
(Continued)

*Primary Examiner* — Sean W Collins
(74) *Attorney, Agent, or Firm* — Bridgeway IP Law Group, PLLC; Jihun Kim

(57) ABSTRACT

A high-frequency energy transfer device includes a signal transfer part for transferring a signal to the skin through an electrode assembly, which comprises electrodes to which signals having at least one frequency according to at least one type are applied, and which function as multiple center shafts having one-side surfaces that cross each other and are to come into contact with the skin to be cared, and dielectric materials disposed at one side and the other side of each of the electrodes; and a housing forming a frame for receiving the signal transfer part.

8 Claims, 11 Drawing Sheets

(51) Int. Cl.
  *A61N 1/06* (2006.01)
  *A61N 1/32* (2006.01)
  *A61N 1/40* (2006.01)
  *A61B 18/00* (2006.01)
  *A61B 90/00* (2016.01)

(52) U.S. Cl.
  CPC .... *A61N 1/328* (2013.01); *A61B 2018/00083* (2013.01); *A61B 2018/0047* (2013.01); *A61B 2018/00773* (2013.01); *A61B 2018/128* (2013.01); *A61B 2018/147* (2013.01); *A61B 2090/065* (2016.02); *A61N 1/403* (2013.01)

(56) References Cited

U.S. PATENT DOCUMENTS

2018/0000533 A1* 1/2018 Boll ................ A61B 18/1206
2019/0036023 A1  1/2019 Yi et al.
2020/0069956 A1* 3/2020 de Penning ......... A61N 1/0492

FOREIGN PATENT DOCUMENTS

KR  10-2011-0026244 A   3/2011
KR       10-1622143 B1  5/2016
KR  10-2020-0057386 A   5/2020

* cited by examiner

HIGH-FREQUENCY ENERGY TRANSFER DEVICE

TECHNICAL FIELD

The present invention relates to a high-frequency energy transfer device, and more specifically, to a high-frequency energy transfer device for minimal invasive skin treatment by transferring high-frequency signals to the skin to generate a thermal effect on the skin.

BACKGROUND ART

Recently, as energy is provided to the skin using various energy sources, techniques for treating the skin by modifying tissue conditions of the skin or improving tissue characteristics are widely applied. Skin treatment devices using various energy sources, such as a laser beam, a flash lamp, ultrasound, and the like, are developed, and recently, researches on the skin treatment devices using RF high-frequency energy are actively conducted.

When high-frequency energy is provided on the skin surface, molecules constituting the skin tissues vibrate and rub against each other whenever the direction of high-frequency current changes, and deep heat is generated by a rotational, twisting or collision motion. As the deep heat like this raises the temperature of the skin tissues and reorganizes the collagen layer, wrinkles are improved, and elasticity of the skin is enhanced.

In addition, there is an effect of improving the overall condition of the skin, including prevention of skin aging by increasing and promoting blood circulation in the skin tissues.

At this point, as a conventional technique related to a device for treating skin tissues, Korean Laid-Opened Patent No. 10-2004-0093706 (published on Nov. 8, 2004) has been proposed.

The proposed conventional technique relates to a high-frequency treatment handpiece comprising a handpiece housing, an electrode assembly configured to be detachably connected to the handpiece housing, and a fluid transfer member mechanically connected to the electrode assembly. Here, the electrode assembly is configured to electro-capacitively connect the high-frequency energy to the tissues and mechanically connect the high-frequency energy to the electrode assembly in order to noninvasively treat the underlying tissues of the skin surface by means of high-frequency energy. In addition, disclosed is a handpiece device including non-volatile memory configured to store one or more among a duty cycle for controlling the fluid transfer member, the number of times moving the electrode assembly on the skin surface, and the number of areas treated by the electrode assembly.

The proposed conventional technique is characterized in that it controls while treating by stimulating the skin in a way of supplying high-frequency energy to the inside of a human body. In this process, in order to obtain a more efficient and stable treatment effect, it is very important to continuously supply high-frequency energy having a predetermined power and uniformly transfer the high-frequency energy to the skin of a treatment area while maintaining contact with the skin of the treatment.

DISCLOSURE OF INVENTION

Technical Problem

Therefore, the present invention has been made in view of the above problems, and it is an object of the present invention to provide a high-frequency energy transfer device for minimal invasive skin treatment by transferring high-frequency signals to the skin to generate a thermal effect.

The technical problems to be solved by the present invention are not limited to the technical problems mentioned above, and unmentioned other technical problems can be clearly understood by those of skilled in the art from the following description.

Technical Solution

To accomplish the above object, according to one aspect of the present invention, there is provided a high-frequency energy transfer device comprising: a signal transfer unit for transferring a signal to the skin through an electrode assembly including an electrode configured as a plurality of central axes intersecting with each other on one side that is in contact with the skin to be cared, and applied with a signal having at least one frequency according to at least one skin care type, and a dielectric material disposed on one side and the other side of the electrode; and a housing that forms a frame for receiving the signal transfer unit.

In an embodiment of the present invention, the dielectric material may form a plurality of quadrants with respect to the electrode.

In an embodiment of the present invention, the electrode assembly may include: a conductive plate; a non-conductive assembly disposed on the dielectric material corresponding to the electrode disposed on the conductive plate, and positioned on the top or bottom of the electrode; and a non-conductive plate positioned on the top of the electrode and the dielectric material, having a shape rotated by a predetermined angle with respect to the shape of the dielectric material, and formed to be larger than the area of the dielectric material.

In an embodiment of the present invention, the electrode may include a first electrode and a second electrode as central axes of the non-conductive plate, wherein the first electrode may be disposed to cross the inside of the conductive plate to receive the signal, and the second electrode may be disposed to cross the inside of the conductive plate and intersect with the first electrode to receive a signal having a period the same as or different from that of a signal applied to the first electrode.

In an embodiment of the present invention, the first electrode and the second electrode may include a plurality of signal application units disposed at both ends to receive the signal, wherein each of the first electrode and the second electrode may receive the signal applied to the signal application units disposed at both ends, and maintain magnitude of the signal transferred to the quadrants to be higher than a threshold value.

In an embodiment of the present invention, the high-frequency energy transfer device may further comprise a signal generation unit for generating a signal having the at least one frequency to be applied to the electrode.

In an embodiment of the present invention, the signal generation unit may include a first signal generation unit for generating a first signal having the at least one frequency, and a second signal generation unit for generating a second signal having a period the same or different from a period according to the first signal.

In an embodiment of the present invention, the high-frequency energy transfer device may further comprise a sensor unit for sensing a pressure that is input as the electrode assembly moves while being in contact with the skin.

In an embodiment of the present invention, the sensor unit may sense the pressure that is input as the electrode assembly moves while being in contact with the skin, and apply, when the input pressure is higher than a preset reference pressure value, a trigger signal to the signal generation unit, and the signal generation unit may generate a signal having the at least one frequency according to whether the trigger signal is applied.

Advantageous Effects

According to an embodiment of the present invention, high-frequency energy having a predetermined power may be continuously supplied to the skin of a treatment target, and the high-frequency energy may be uniformly transferred to a wider skin area.

In addition, through the disposition form of various dielectric materials according to disposition of electrodes, more efficient treatment effects may be obtained on the face, particularly, in the treatment areas such as eyes, forehead, nose, and the like.

It should be understood that the effects of the present invention are not limited to the effects described above, and include all effects that can be inferred from the configuration of the present invention described in the detailed description or claims of the present invention.

BEST MODE FOR CARRYING OUT THE INVENTION

Figure 1:
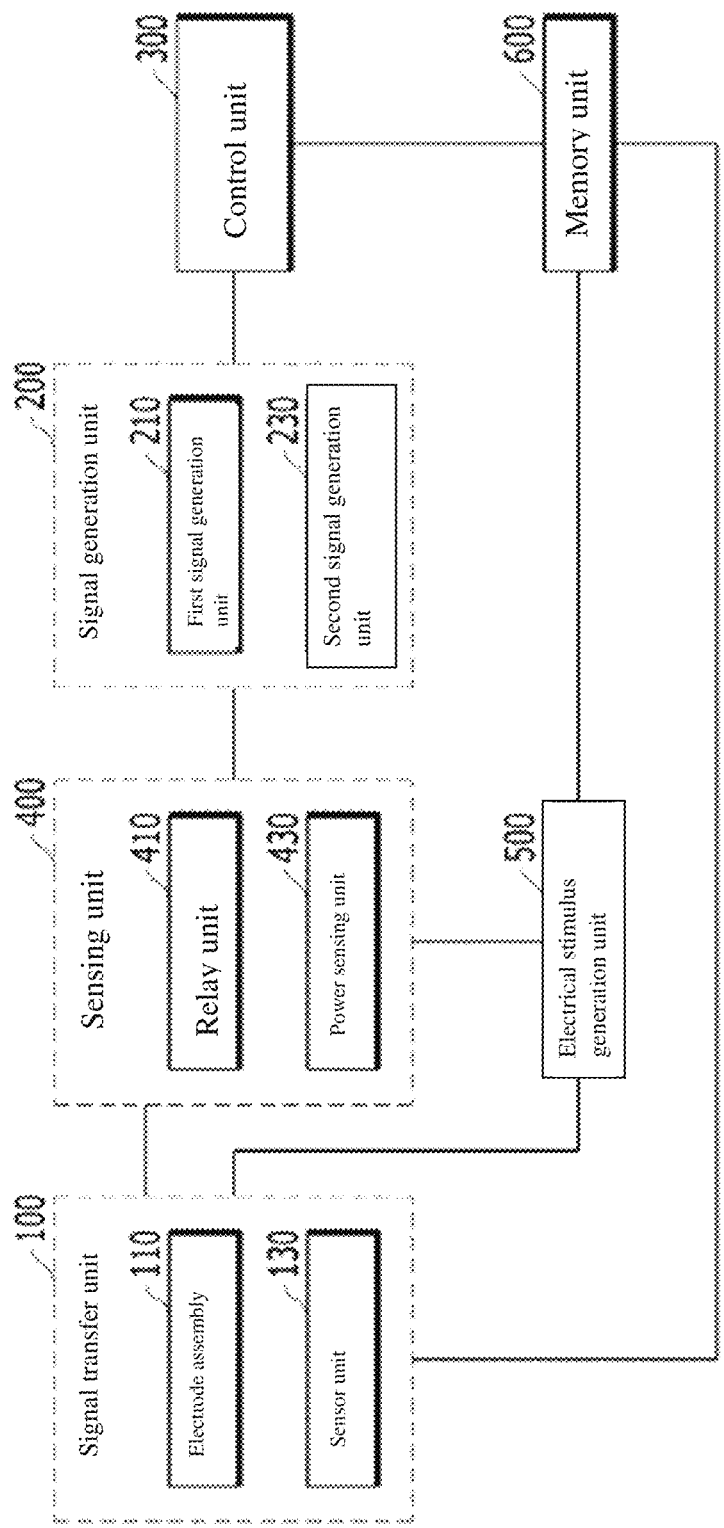
FIG. 1 is a diagram schematically showing the overall configuration according to an embodiment of the present invention.

Hereinafter, the present invention will be described with reference to the accompanying drawings. However, the present invention may be implemented in several different forms, and thus is not limited to the embodiments described herein. In addition, in order to clearly explain the present invention in the drawings, parts unrelated to the description are omitted, and similar reference numerals are attached to similar parts throughout the specification.

Throughout the specification, when a part is "linked (connected, contacted, coupled)" to another part, it includes the cases of being "indirectly connected" with intervention of another member therebetween, as well as the cases of being "directly connected". In addition, when a part "includes" a certain component, this means that other components may be further provided, rather than excluding other components, unless clearly stated otherwise.

The terms used in this specification are used only to describe specific embodiments, and are not intended to limit the present invention. Singular expressions include plural expressions unless the context clearly dictates otherwise. It should be understood that in this specification, terms such as "comprise" or "have" are intended to specify existence of a feature, number, step, operation, component, part, or a combination thereof described in the specification, not to preclude the possibility of existence or addition of one or more other features, numbers, steps, operations, components, parts, or combinations thereof.

Hereinafter, embodiments of the present invention will be described in detail with reference to the accompanying drawings.

Figure 2:
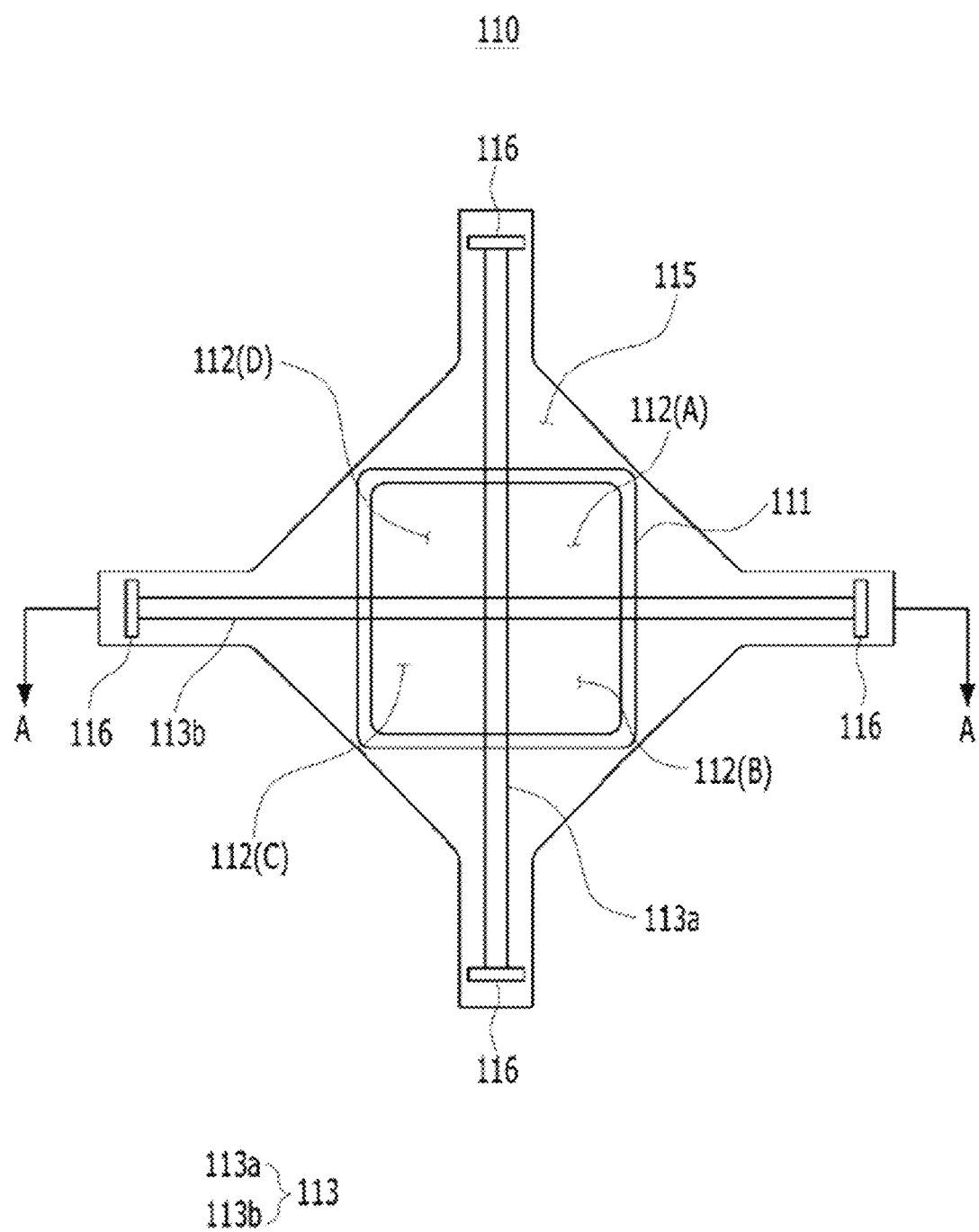
FIG. 2 is a view showing the configuration of an electrode assembly according to an embodiment of the present invention.
Figure 3:
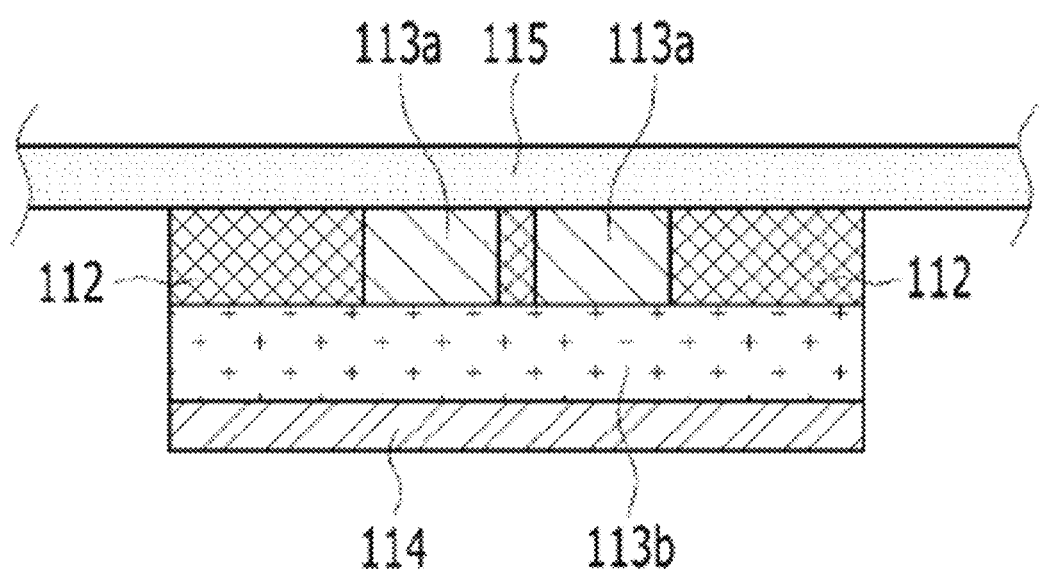
FIG. 3 is a cross-sectional view taken along line A-A of the electrode assembly according to an embodiment of the present invention as shown in FIG. 2.
Figure 4:
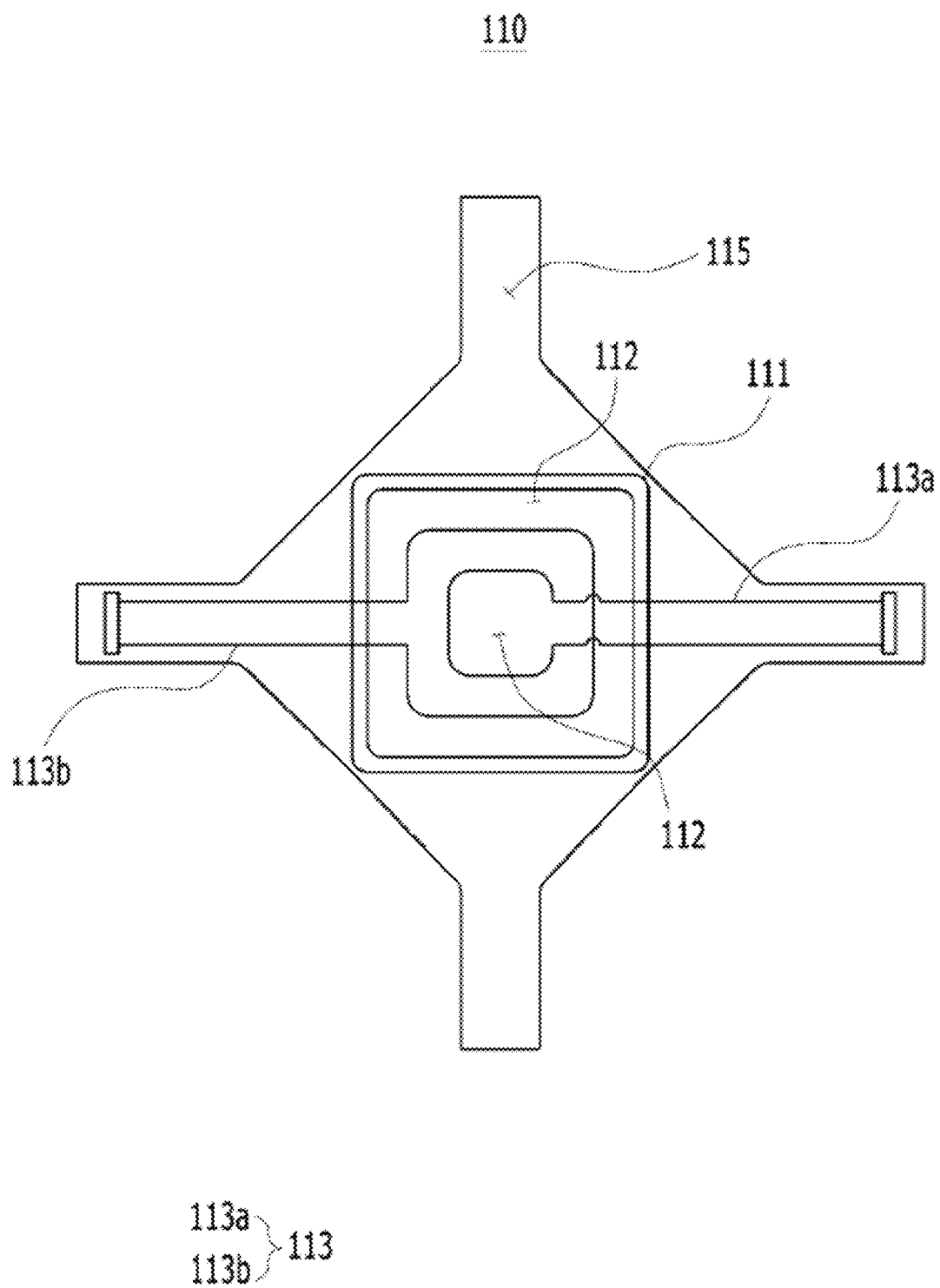
FIG. 4 is a view showing the configuration of an electrode assembly according to another embodiment of the present invention.
Figure 7:
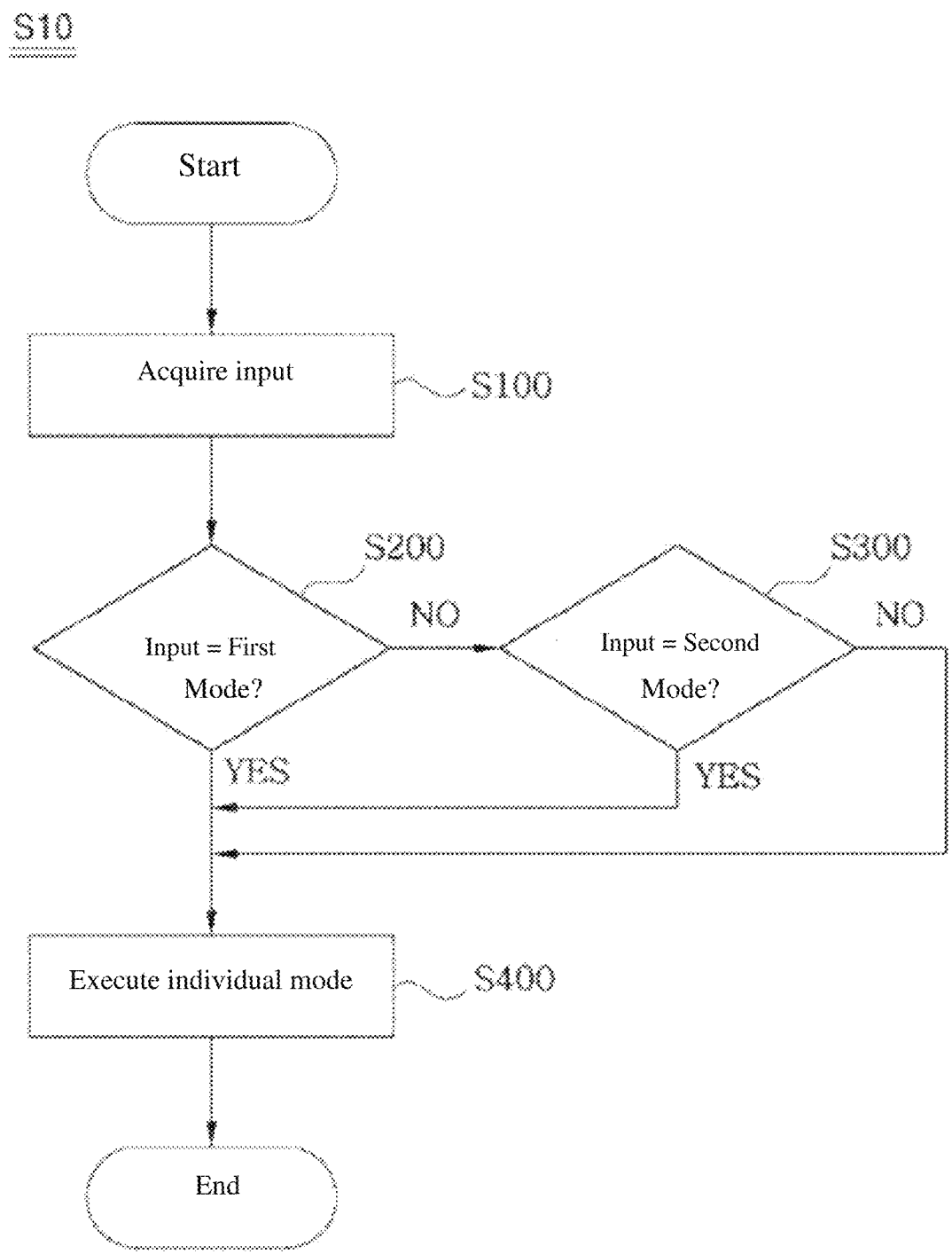
FIG. 7 is a flowchart illustrating an operation method of a high-frequency energy transfer device over time according to an embodiment of the present invention.
Figure 8:
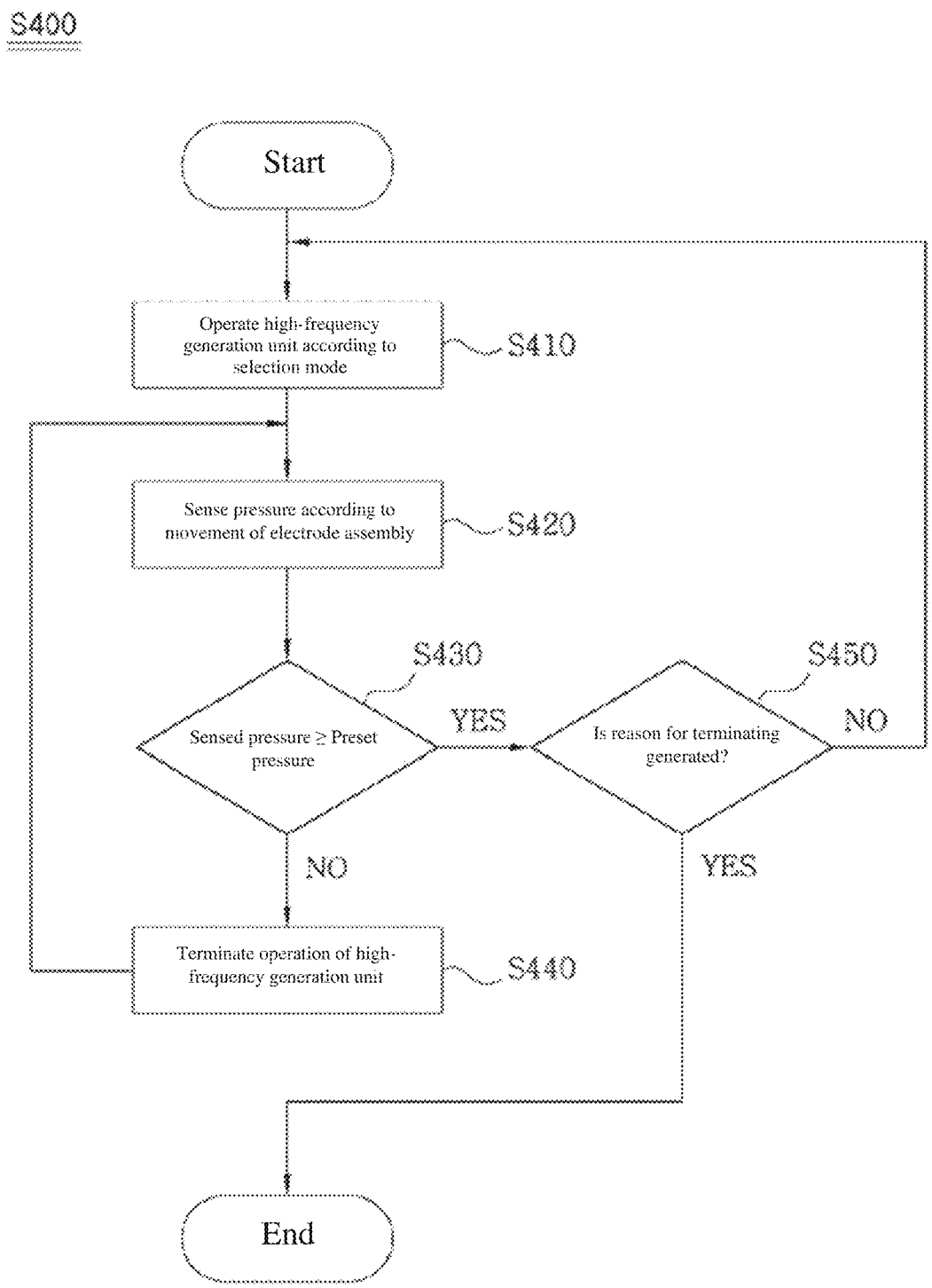
FIG. 8 is a flowchart illustrating an individual mode execution step according to an embodiment of the present invention.
Figure 9:
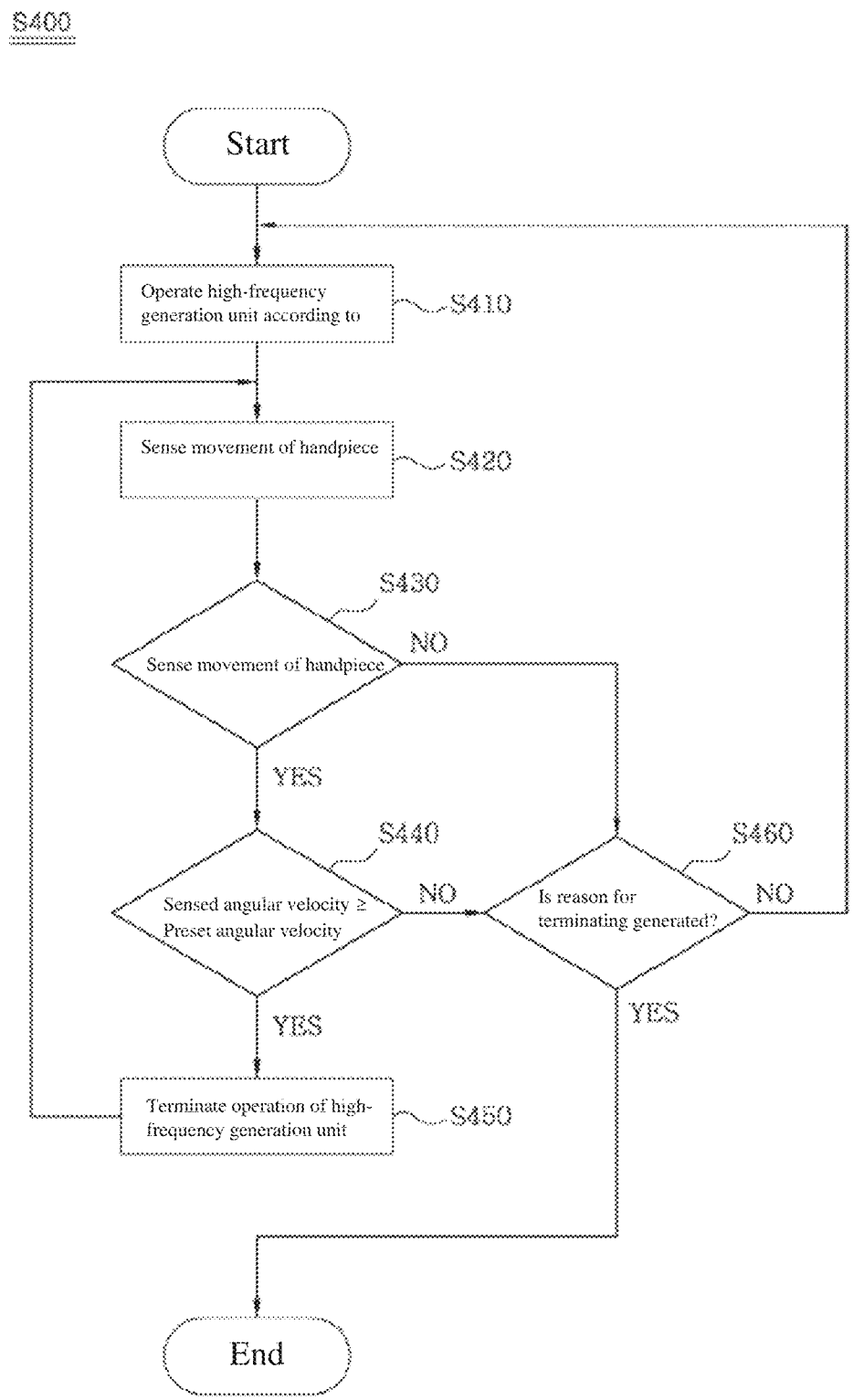
FIG. 9 is a flowchart illustrating an individual mode execution step according to another embodiment of the present invention.

FIG. 1 is a diagram schematically showing the overall configuration according to an embodiment of the present invention. FIG. 2 is a view showing the configuration of an electrode assembly according to an embodiment of the present invention. FIG. 3 is a cross-sectional view taken along line A-A of the electrode assembly according to an embodiment of the present invention. FIG. 4 is a view showing the configuration of an electrode assembly according to another embodiment of the present invention. FIGS. 5A-5B to 6A-6B are views showing profiles of various input pulse signals of a control unit for generating signals through a signal generation unit according to an embodiment of the present invention. FIG. 7 is a flowchart illustrating an operation method of a high-frequency energy transfer device over time according to an embodiment of the present invention. FIG. 8 is a flowchart illustrating an individual mode execution step according to an embodiment of the present invention. FIG. 9 is a flowchart illustrating an individual mode execution step according to another embodiment of the present invention.

A high-frequency energy transfer device according to an embodiment of the present invention is for minimal invasive skin care (treatment) by transferring a high-frequency signal to the skin in contact to generate a thermal effect on the skin. The high-frequency energy transfer device according to the present embodiment may include a handpiece of a form easy to grip, a signal transfer unit 100 for transferring a high-frequency signal to the skin, and a housing. The housing according to the present embodiment may form a frame for accommodating the signal transfer unit 100.

Referring to FIG. 1 according to an embodiment of the present invention, the high-frequency energy transfer device may be configured to further include a signal generation unit 200, a control unit 300, a sensing unit 400, an electrical stimulus generation unit 500, and a memory unit 600.

The signal transfer unit 100 according to the present embodiment may be in contact with the skin to be cared and transfer a high-frequency signal to the skin in contact. The signal transfer unit 100 may provide a uniform thermal effect to the tissues of the skin at a depth selected to minimize or prevent thermal damage to the skin surface and tissues.

The signal transfer unit 100 according to the present embodiment may include an electrode assembly 110 and a sensor unit 130.

When the electrode assembly 110 is in contact with the skin, the high-frequency signal transferred from the signal generation unit 200 described below may be more uniformly transferred to the skin. The electrode assembly 110 may be disposed at the front end of the signal transfer unit 100 in order to more easily transfer the high-frequency signal as it is in contact with the skin. For a more detailed description of the electrode assembly 110, refer to FIG. 2.

Referring to FIGS. 2 and 3, the electrode assembly 110 according to an embodiment of the present invention may be configured to include a conductive plate 111, a dielectric material 112, an electrode 113, a non-conductive assembly 114, and a non-conductive plate 115.

The conductive plate 111 may be in contact with the skin. The conductive plate 111 may receive a signal (high-frequency signal) generated by the signal generation unit 200 described below, and transfer the received signal to the skin in contact with.

The conductive plate 111 may receive a signal generated by the signal generation unit 200 through the electrode 113 disposed inside. The conductive plate 111 is disposed on the non-conductive plate 115 to be fixed in the electrode assembly 110, and the conductive plate 111 may be disposed at the center of the non-conductive plate 115.

The conductive plate 111 may easily transfer the signal (high-frequency signal), which is transferred from the electrode 113 through the dielectric material 112, to the skin in contact with.

The electrode 113 is a plurality of central axes of the signal transfer unit 100 intersecting with each other, and may be supplied with a signal having at least one frequency according to at least one type from the signal generation unit 200. The electrode 113 of the present invention may uniformly transfer a high-frequency signal to the entire area of the skin in contact with the signal transfer unit 100 through a structure disposing a plurality of electrodes having a plurality of central axes intersecting with each other. In addition, the type means a skin care type, and for example, the high-frequency energy transfer device of the present invention may output a signal type determined according to at least one skin care type.

Here, a signal (hereinafter, high-frequency signal) applied from the signal generation unit 200 has at least one frequency, and the at least one frequency may be a high-frequency signal corresponding to a frequency range of a predetermined range or wider.

The dielectric material 112 may be divided into two sides with respect to the electrode 113 when the electrode 113 is formed to be disposed to cross the inside from one end of the conductive plate 111 toward the other side, and accordingly, the dielectric material 112 may have a shape disposed on one side and the other side with respect to the electrode 113, respectively.

At this point, when the electrode 113 is provided as a first electrode 113a and a second electrode 113b and disposed on the conductive plate 111 to intersect with each other, the dielectric material 112 may be disposed in the area of the conductive plate 111 divided by the first electrode 113a and the second electrode 113b to have a plurality of separated forms.

As a plurality of electrodes is disposed to cross the conductive plate 111, the dielectric material 112 according to an embodiment as shown in FIG. 2 may form a plurality of quadrants 112(A), 112(B), 112(C), and 112(D) based on the plurality of electrodes.

The dielectric material 112 may receive the high-frequency signal from the electrode 113 and transfer the high-frequency signal to the skin in contact with. The dielectric material 112 may be disposed to be separated by the disposition form of the electrode 113, and may perform a function of transferring the high-frequency signal transferred from the electrode 113 to be distributed on the skin. The dielectric material 112 is made of silicon, polyimide, Kapton, or the like, and a material capable of easily generating an electrical induction action when power is supplied is sufficient.

When the electrode 113 is disposed on the conductive plate 111, the dielectric material 112 is disposed on the conductive plate 111 in a state separated with respect to the electrode 113, and when the high-frequency signal received from the electrode 113 is transferred, the dielectric material 112 may receive and distribute the high-frequency signal to a wider range.

When the conductive plate 111 is in contact with the skin, the electrode 113 may be a high-frequency signal transfer wire for transferring the high-frequency signal generated by the signal generation unit 200 to the skin. For example, the electrode 113 performs a function of guiding the path of the high-frequency signal input from one end to flow toward the other end.

At this point, at least one electrode 113 may be disposed on the conductive plate 111. When the electrode 113 is disposed on the conductive plate 111, it may be more preferable to have a form disposed to cross the conductive plate 111. The electrode 113 according to the present embodiment may be provided as a first electrode 113a and a second electrode 113b.

According to an embodiment as shown in FIG. 2, the electrode assembly 110 of the present invention may further include a signal application unit 116 for applying the high-frequency signal to the first electrode 113a and the second electrode 113b. Referring to FIG. 2, the signal application unit 116 may be provided at both ends of the first electrode 113a and the second electrode 113b, respectively.

For example, when there is a resistor between the first electrode 113a and the second electrode 113b, magnitude of the signal input into one end of the electrode becomes weaker toward the other end. In the present invention, since the skin in contact with the first and second electrodes 113a and 113b acts as a resistor, when the first and second electrodes 113a and 113b receive a high-frequency signal only through one end, the signal will become weaker toward the other end. However, since each of the first and second electrodes 113a and 113b according to an embodiment of the present invention receives a high-frequency signal from the signal application units 116 provided at both ends, the signal power at the other end with respect to the center and one end applied with the high-frequency signal may also be maintained to be higher than a threshold value, so that energy output can be realized as much as desired, and thus there is an advantage of performing skin care more effectively.

Accordingly, the magnitude of the high-frequency signal in the quadrants 112(A), 112(B), 112(C), and 112(D) of the dielectric material 112 may also be output to be higher than the threshold value.

The high-frequency signal may be transferred to each of the first electrode 113a and the second electrode 113b by the signal application unit 116 described above. At this point, the high-frequency signal is transferred to each of the first electrode 113a and the second electrode 113b, and a high-frequency signal of the same power is transferred simultaneously or in a specific pattern, or a plurality of high-frequency signals, each having a predetermined time interval and a different power, may be transferred to the first electrode 113a and the second electrode 113b.

Referring to FIG. 2, the dielectric material 112 may be divided into two sides with respect to the electrode 113 as the electrode 113 is disposed to cross the inside from one end of the conductive plate 111 toward the other side, and accordingly, the dielectric material 112 may have a shape disposed on one side and the other side with respect to the electrode 113, respectively. More specifically, as the electrode 113 is disposed on the conductive plate 111 to intersect the first electrode 113a and the second electrode 113b with each other, the dielectric material 112 may be disposed in the area of the conductive plate 111 divided by the first electrode 113a and the second electrode 113b to have a plurality of separated forms (e.g., quadrants).

The non-conductive assembly 114 may be made of non-magnetic and non-conductive materials. The non-conductive assembly 114 may be disposed on the dielectric material 112 to correspond to the disposition form of the electrode 113 disposed on the conductive plate 111, and may be located on the top or bottom of the electrode 113.

When the high-frequency signal is transferred to the electrode 113 while the electrode assembly 110 is in contact with the skin, the non-conductive assembly 114 may perform a function of preventing the high-frequency signal from being directly transferred to the skin through the electrode 113.

According to another embodiment of the present invention, the non-conductive assembly 114 may be disposed directly on the top surface of the electrode 113, and in this case, as both side surfaces of the electrode 113 is in contact with the dielectric material 112, the high-frequency signal may be transferred to the dielectric material 112.

The non-conductive plate 115 is positioned on the electrode 113 and the dielectric material 112, and has a shape rotated by a predetermined angle with respect to the shape of the dielectric material 112, and it may be formed to be larger than the area of the dielectric material 112.

According to an embodiment as shown in FIG. 2, the dielectric material 112 of the present invention may be formed in a square shape with respect to the areas formed by the intersections of the first and second electrodes 113a and 113b, and the non-conductive plate 115 is formed in a diamond shape rotated by a predetermined angle with respect to the dielectric material 112 provided in a square shape, and the vertex portions of the diamond shape, in which a plurality of signal application units 116 is disposed, may be formed long in a protruding shape.

According to the present embodiment, the center of the dielectric material 112 and the non-conductive plate 115 may be an area formed by the intersections of the first electrode 113a and the second electrode 113b.

FIG. 4 is a view showing an electrode assembly according to another embodiment of the present invention, and the electrode 113 according to the present embodiment may be disposed in a shape circling the inside.

The first electrode 113a may be disposed to circle inside the conductive plate 111. The second electrode 113b corresponds to the disposition form of the first electrode 113a, and when the second electrode 113b is disposed inside the conductive plate 111, it may be positioned to be spaced apart from the outside of the first electrode 113a.

More specifically, the disposition form of the dielectric material 112 varies according to the disposition form of the electrode 113, and the disposition form of the dielectric material 112 according to an embodiment may be divided into an inner side and an outer side with respect to the electrode 113 when the electrode 113 has a disposition form circling inside the conductive plate 111, and accordingly, the dielectric material 112 may have a form disposed inside and outside the electrode 113, respectively.

Referring to FIG. 1 again, the signal generation unit 200 may generate a signal having at least one frequency to be applied to the electrode 113. At this point, the signal generated by the signal generation unit 200 may be a high-frequency signal. The high-frequency signal generated by the signal generation unit 200 may be a "radio frequency (RF)" signal. The signal generation unit 200 may output the high-frequency signal at a predetermined power with a specific frequency and pattern. The signal generation unit 200 may transfer the high-frequency signal to the electrode assembly 110 to have a specific frequency and pattern. The signal generation unit 200 may generate a pulse-type high-frequency signal.

At this point, the signal generation unit 200 may receive a pulse signal (pulse signer) from the control unit 300 described below to generate a high-frequency signal according to a specific frequency and pattern, and generate a high-frequency signal at a frequency and power corresponding to the pulse signal.

Here, at least one signal generation unit 200 may be configured. The signal generation unit 200 may include, for example, a first signal generation unit 210 and a second signal generation unit 230.

The first signal generation unit 210 may generate a first signal having at least one frequency, more specifically, a high-frequency signal of a specific frequency, and supply the high-frequency signal to at least one electrode 113. It may be more preferable that the first signal generation unit 210 supplies the high-frequency signal to both ends of the first electrode 113a of the electrode 113.

The second signal generation unit 210 may generate a high-frequency signal of a specific frequency and supply the high-frequency signal to at least one electrode 113. It may be more preferable that the second signal generation unit 230 supplies the high-frequency signal to both ends of the second electrode 113b of the electrode 113.

Here, although the high-frequency signals generated by the first and second high-frequency generation units 210 and 230 may be separately supplied to the first and second electrodes 113a and 113b, both the high-frequency signals generated by the first and second high-frequency generation units 210 and 230 may be supplied to one electrode.

In this case, the signal generation unit 200 may receive a pulse signal from the control unit 300 to sequentially output the high-frequency signals generated by the first signal generation unit 210 and the second signal generation unit 230 at a predetermined time interval from each other.

In addition, as another embodiment, when the first electrode 113a and the second electrode 113b of the electrode 113 of the electrode assembly 110 are provided on the conductive plate 111 to intersect with each other, the signal generation unit 200 may supply high-frequency signals of the same frequency and power or different frequencies and powers to both ends of the first electrode 113a and the second electrode 113b, respectively.

For example, the first signal generation unit 210 may supply the high-frequency signal to both ends of the first electrode 113a at the same or a different time interval, and the second signal generation unit 230 may supply the high-frequency signal to both ends of the second electrode 113b at the same or a different time interval.

In addition, after supplying the high-frequency signal to one end of the first electrode 113a and one end of the second electrode 113b through the first signal generation unit 210, the high-frequency signal may be supplied to the other end of the first electrode 113a and the other end of the second electrode 113b through the second signal generation unit 230.

The control unit 300 may control the signal generation unit 200. The control unit 300 may control the operation of the signal generation unit 200 so that high-frequency signals having a specific frequency and power may be generated by the signal generation unit 200 in various patterns. The control unit 300 may adjust the frequency and power of the high-frequency signal generated by the signal generation unit 200 and the pulse interval of each high-frequency signal.

That is, the control unit 300 is a control device for controlling output of the high-frequency signal generated by the signal generation unit 200 to the electrode assembly 110 of the signal transfer unit 100, and may generate a pulse signal (pulse signer) for controlling the frequency and power of the high-frequency signal and the pulse interval, and input the pulse signal into the signal generation unit 200. At this point, the control unit 300 may provide the pulse signal to the signal generation unit 200 in a pulse method.

In addition, when the signal generation unit 200 is configured of the first signal generation unit 210 and the second signal generation unit 230, the control unit 300 may input the pulse signal into the first and second high-frequency generation units 210 and 230 to control the first signal generation unit 210 and the second signal generation unit 230, respectively.

Figure 5A:
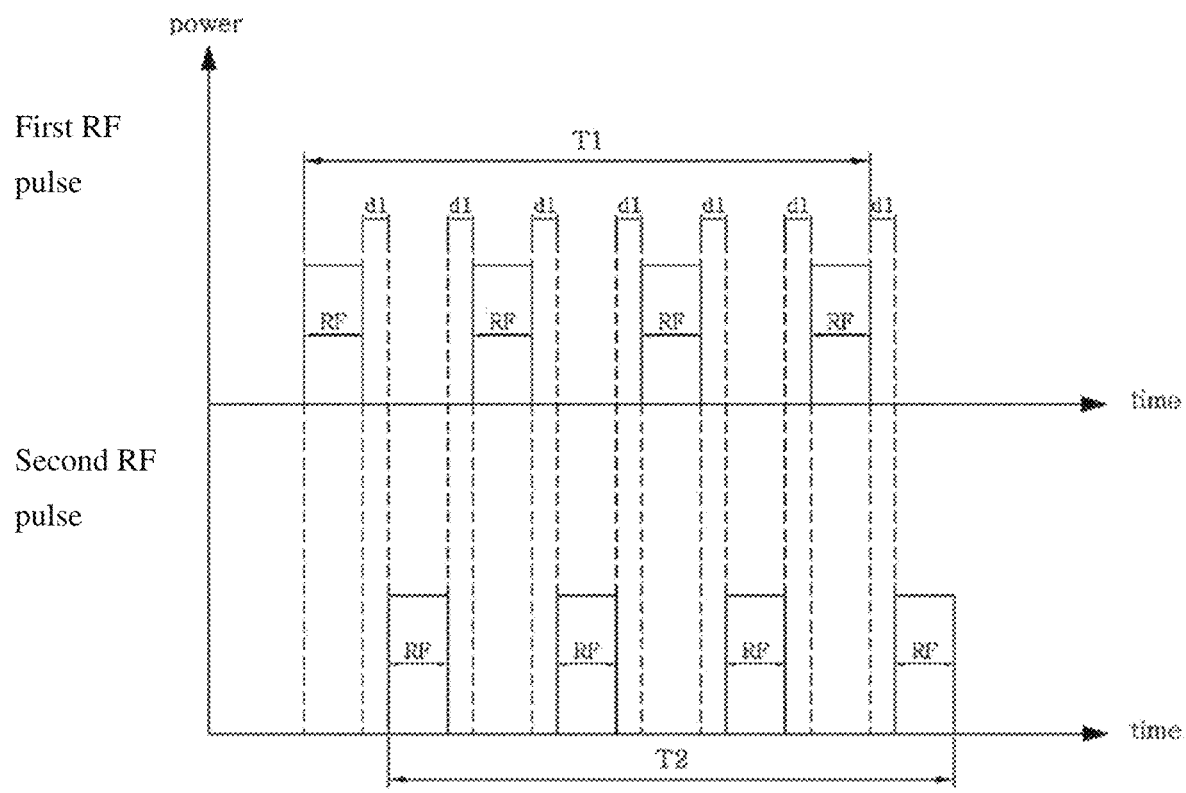
FIGS. 5A-5B to 6A-6B are views showing profiles of various input pulse signals of a control unit for generating signals through a signal generation unit according to an embodiment of the present invention.

More specifically, referring to FIG. 5A, when a high-frequency signal is generated by the first signal generation unit 210, the control unit 300 may input a pulse signal into the first and second signal generation units 210 and 230 respectively so that a high-frequency signal may be generated by the second signal generation unit 230. In this case, the control unit 300 may input a pulse signal for generating the high-frequency signal of the first signal generation unit 210, and input a pulse signal for generating the high-frequency signal of the second signal generation unit 230 after a first time interval d1. The control unit 300 may input the pulse signal into the first signal generation unit 210 and the second signal generation unit 230 respectively with the first time interval d1. At this point, the first signal generation unit 210 and the second signal generation unit 230 may input at least one pulse signal during the first period T1 and the second period T2, respectively. Accordingly, the pulse signal may be input to alternately output the high-frequency signal of the first signal generation unit 210 and the high-frequency signal of the second signal generation unit 230 with a first time interval d1.

Figure 5B:
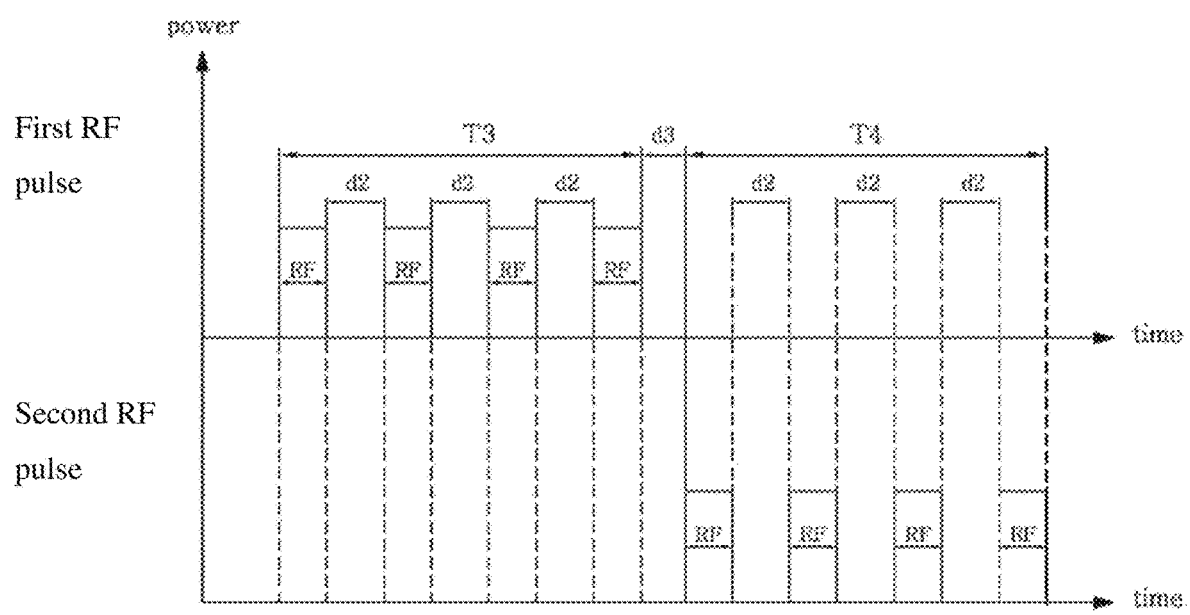

In addition, referring to FIG. 5B, when the first signal generation unit 210 generates a plurality of high-frequency signals, the control unit 300 may input a pulse signal into the first and second signal generation units 210 and 230 so that a plurality of high-frequency signals may be generated by the second signal generation unit 230. In this case, the control unit 300 may input a plurality of pulse signals during the first period T1 with a second time interval d2 to generate a high-frequency signal of the first signal generation unit 210, and input a plurality of pulse signals during the second period T2 with a second time interval d2 to generate a high-frequency signal of the second signal generation unit 230 after a third time interval d3.

Accordingly, the control unit 300 controls the signal generation unit 200 by inputting a pulse signal for generating a high-frequency signal at regular time intervals into the signal generation unit 200 for a specific period.

Meanwhile, the signal transfer unit 100 may further include a sensor unit 130 for sensing changes in the pressure that is input according to the change of the skin portion, with which the electrode assembly 110 is in contact, due to movement of the housing.

At least one sensor unit 130 may be provided in the signal transfer unit 100 to sense movement of the electrode assembly 110. The sensor unit 130 may control whether or not to transfer the high-frequency signal so that the high-frequency signal may be transferred to the electrode assembly 110 as movement of the electrode assembly 110 is sensed. The sensor unit 130 may sense at least any one or more among the movement, moving speed, moving acceleration, angular velocity, inclination, location, and moving direction of the signal transfer unit 100 or the electrode assembly 110, and the sensor unit 130 may be implemented as at least one among an IR sensor, an acceleration sensor, a gyro sensor, and a pressure sensor.

For example, a pressure sensor for sensing pressure that is input according to the movement of the electrode assembly 110 may be used as the sensor unit 130. As the sensor unit 130 senses a pressure that is input according to movement of the electrode assembly 110, when the sensed pressure is higher than or equal to a preset reference pressure value, a trigger signal may be applied to the signal generation unit 200. Accordingly, the signal generation unit 200 may generate a high-frequency signal according to whether or not the trigger signal is applied from the sensor unit 130, and apply the high-frequency signal to the signal application unit 116.

In addition, when the sensed pressure is continuously sensed to be higher than or equal to the reference pressure value after the trigger signal is applied, the sensor unit 130 may maintain transfer of the high-frequency signal to the electrode assembly 110.

Figure 6A:
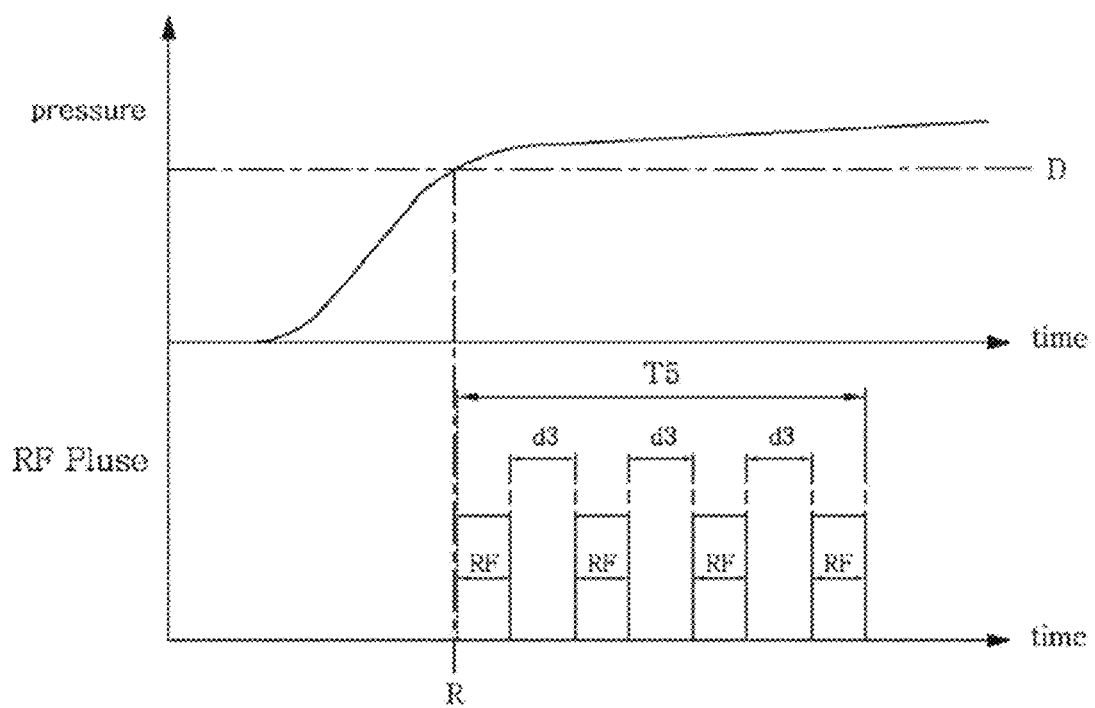
Figure 6B:
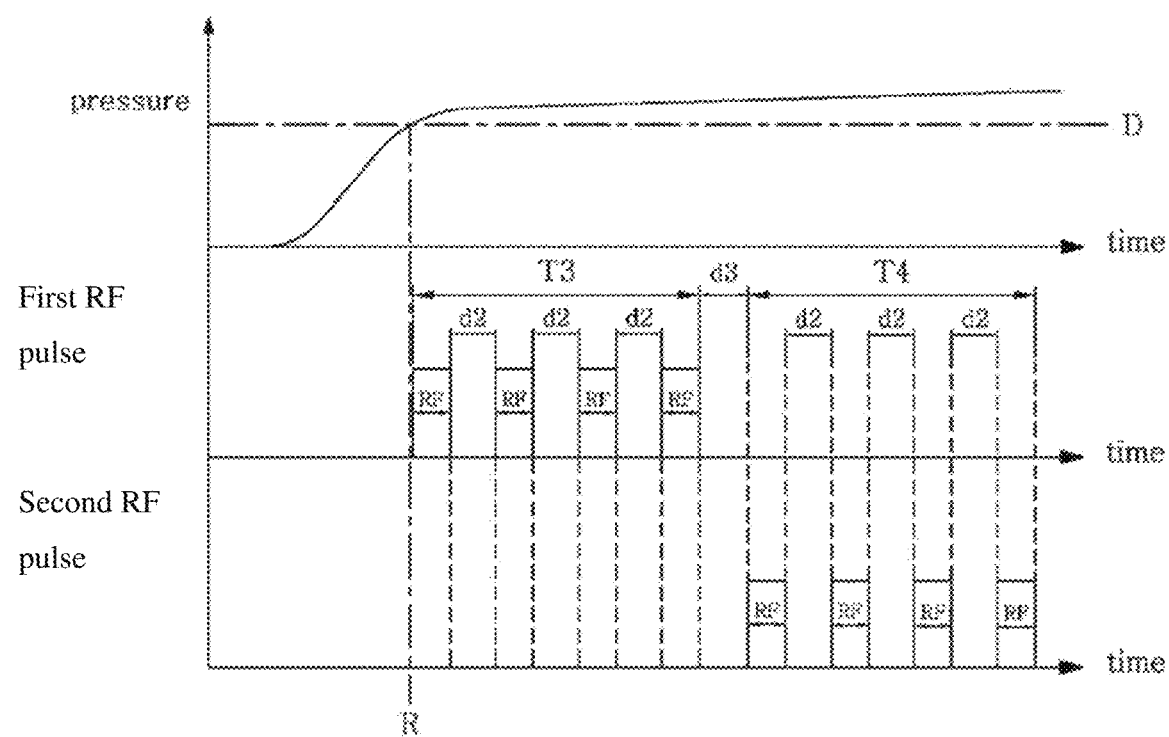

More specifically, referring to FIGS. 6A-6B, the sensor unit 130 may sense a pressure that is input as the electrode assembly 110 is in contact with the skin while a pulse signal is input from the control unit 300, and transfer the sensed pressure generated by the signal generation unit 200 to the skin via the electrode assembly 110 at a point R when the sensed pressure reaches a preset reference pressure D.

As shown in FIG. 6A, for example, when a pulse signal is input through the control unit 300, the sensor unit 130 may control a plurality of high-frequency signals to be output during a fifth period T5 with a third time interval d3 through the signal generation unit 200 while the sensed pressure maintains the reference pressure D or higher. In addition, as shown in FIG. 6B, the sensor unit 130 may control a high-frequency signal corresponding to the shape of the pulse signal shown in FIG. 5B through the control unit 300 to be output while the sensed pressure maintains the reference pressure D or higher.

That is, the sensor unit 130 allows output of a high-frequency signal corresponding to the pulse signal input through the control unit 300 while the sensed pressure maintains the reference pressure or higher, and when the sensed pressure is not maintained to be higher than the reference pressure, the sensor unit 130 may block output of the high-frequency signal to the electrode assembly 110.

Accordingly, by sensing the pressure that is input as the electrode assembly 110 moves during the treatment process, the sensor unit 130 may perform a function of controlling to accomplish supply of the high-frequency signal to the skin when the contact state between the electrode assembly 110 and the skin is maintained continuously.

In addition, for example, a gyro sensor for sensing the angular velocity of the signal transfer unit 100 may be used as the sensor unit 130. At this point, when the angular velocity of the signal transfer unit 100 is sensed to be higher than or equal to a preset angular velocity, the sensor unit 130 may block transfer of the high-frequency signal to the electrode assembly 110. In this case, separation of the electrode assembly 110 from the skin, which occurs as the signal transfer unit 100 is tilted, may be prevented by continuously sensing the angular velocity of the signal transfer unit 100 during the treatment process. That is, it may be controlled to supply the high-frequency signal to the skin only when the electrode assembly 110 is normally and tightly in contact with the skin to be treated during treatment.

In addition, for example, an acceleration sensor for sensing acceleration of the signal transfer unit 100 may be used as the sensor unit 130. At this point, when acceleration of the signal transfer unit 100 is sensed to be higher than or equal to a preset acceleration, the sensor unit 130 may maintain transfer of the high-frequency signal to the electrode assembly 110. In this case, as acceleration of the signal transfer unit 100 is continuously sensed during the treatment process, the signal transfer unit 100 may prevent burning of the skin that may occur as more high-frequency signals are transferred to the skin in a specific area. That is, it may be controlled to supply the high-frequency signal to the skin only when the signal transfer unit 100 moves on the skin during treatment.

Accordingly, the sensor unit 130 may control whether or not to transfer the high-frequency signal from the signal generation unit 200 according to the sensed angular velocity or acceleration of the signal transfer unit 100. More specifically, when the user supplies a high-frequency signal while moving the signal transfer unit 100 on the skin, and there is no change in the movement of the signal transfer unit 100, the sensor unit 130 blocks the high-frequency signal of the signal generation unit 200 not to be transferred to the electrode assembly 110.

In addition, the high-frequency energy transfer device of the present invention may further include a sensing unit 400.

The sensing unit 400 may sense the frequency, power, pulse interval, and the like of the high-frequency signal.

More specifically, when the high-frequency signal generated by the signal generation unit 200 is received, the sensing unit 400 may compare and determine the output of the high-frequency signal corresponding to the pulse signal input through the control unit 300 by comparing the frequency, power, and pulse interval of the high-frequency signal, which are for generating the high-frequency signal from the pulse signal input from the control unit 300, with the frequency, power, and pulse interval of the high-frequency signal generated by the signal generation unit 200.

Here, when the high-frequency signal is not generated to correspond to the pulse signal input from the control unit 300, the sensing unit 400 may correct the high-frequency signal to correspond to the pulse signal input from the control unit 300.

That is, the sensing unit 400 compares the high-frequency signal with the pulse signal input from the control unit 300 to sense whether the frequency, power, and pulse interval of the high-frequency signal output from the signal generation unit 200 corresponds to the input pulse signal, and when the output high-frequency signal is different from the input pulse signal, the sensing unit 400 performs a function of correcting the high-frequency signal.

In addition, the sensing unit 400 may further include a relay unit 410 and a power sensing unit 430.

The power sensing unit 430 may receive the high-frequency signal from the signal generation unit 200, and sense whether a high-frequency signal corresponding to the pulse signal input from the control unit 300 is output from the signal generation unit 200. The power sensing unit 430 may sense power of the output high-frequency signal by sensing whether the high-frequency signal is normally output from the signal generation unit 200 according to the pulse signal input from the control unit 300.

At this point, when at least one signal generation unit 200 is provided, the power sensing unit 430 may receive the high-frequency signal generated by each of the signal generating units 200, and sense whether a high-frequency signal corresponding to the pulse signal input from the control unit 300 is output for each of the signal generating units 200.

In addition, when the high-frequency signal received from the signal generation unit 200 does not correspond to the input pulse signal, the power sensing unit 430 may correct the high-frequency signal so that a high-frequency signal corresponding to the pulse signal may be output.

For example, when the high-frequency signal transferred from the signal generation unit 200 is output to have a power value lower than or equal to that of the high-frequency signal corresponding to the pulse signal input from the control unit 300, the power sensing unit 430 may sense the low power and increase the power value of the high-frequency signal so that a high-frequency signal having a power value the same as that of the high-frequency signal corresponding to the pulse signal input may be output.

In addition, when at least one signal generation unit 200 is provided, the power sensing unit 430 may receive the high-frequency signal generated by each of the signal generating units 200, and sense the power value of each of the high-frequency signals. Then, when at least one high-frequency signal having a power value different from the power value of the high-frequency signal is output from the pulse signal that is input from the control unit 300, the power sensing unit 430 may correct the power value of the high-frequency signal so that a power value the same as the power value of the high-frequency signal may be output from the input pulse signal.

The relay unit 410 may sense the frequency and pulse interval of the output high-frequency signal by receiving a high-frequency signal from the signal generation unit 200 and sensing whether a high-frequency signal corresponding to the pulse signal input from the control unit 300 is output from the signal generation unit 200.

At this point, when the high-frequency signal received from the signal generation unit 200 does not correspond to the input pulse signal, the relay unit 410 may correct the high-frequency signal so that a high-frequency signal corresponding to the pulse signal may be output.

For example, when the high-frequency signal transferred from the signal generation unit 200 is output to have a frequency lower than or equal to the frequency of the high-frequency signal corresponding to the pulse signal input from the control unit 300, the relay unit 410 may sense the low frequency and perform a function of correcting the frequency of the high-frequency signal so that a high-frequency signal having a frequency the same as the frequency of the high-frequency signal may be output from the input pulse signal.

In addition, when the high-frequency signal transferred from the signal generation unit 200 is output to have a pulse interval shorter than the pulse interval of the high-frequency signal corresponding to the pulse signal input from the control unit 300, the relay unit 410 may sense the short pulse interval and increase the pulse interval of the high-frequency signal so that a high-frequency signal having a pulse interval the same as the pulse interval of the high-frequency signal may be output from the input pulse signal.

In addition, the relay unit 410 may arbitrarily adjust the pulse interval at which the high-frequency signal transferred from the signal generation unit 200 is transferred to the electrode assembly 110, unlike the pulse signal input from the control unit 300.

The electrical stimulus generation unit 500 may generate an electrical stimulation signal having a specific frequency. The electrical stimulus generation unit 500 may generate an electrical stimulation signal having a predetermined waveform and frequency. The electrical stimulation signal generated by the electrical stimulus generation unit 500 may be transferred to the skin through the electrode assembly 110 of the signal transfer unit 100. At this point, when the electrical stimulation signal generated through the electrical stimulus generation unit 500 is transferred to the skin while maintaining a predetermined output value, the impedance may be measured by acquiring the electrical stimulation signal returned from the skin.

That is, the electrical stimulus generation unit 500 performs a function of measuring impedance of the skin, to which the high-frequency signal is transferred, by transferring the electrical stimulation signal having a predetermined waveform and frequency to the skin and acquiring an electrical stimulation signal returned from the skin.

In addition, the electrical stimulus generation unit 500 may continuously store the electrical stimulation signal returned from the skin in the memory unit 600 described below.

At this point, as the electrical stimulus generation unit 500 acquires the impedance value accumulated in the memory unit 600 and calculates an increase rate of the accumulated impedance value, generation of the high-frequency signal by the signal generation unit 200 may be terminated when the degree of increase in the impedance value is measured to be higher than or equal to a preset value.

When a pulse signal is input from the control unit 300 into the signal generation unit 200, the memory unit 600 may store the pulse signal. When at least one signal generation unit 200 is provided, each pulse signal input into each high-frequency generation unit may be stored.

The memory unit 600 may store, among the pulse signal input into the signal generation unit 200, the frequency, power, and pulse interval of the high-frequency signal to be generated through the signal generation unit 200.

The memory unit 600 may receive the pulse signal of the control unit 300 for the sensing unit 400 to compare the high-frequency signal transferred from the signal generation unit 200 with the pulse signal input through the control unit 300. Particularly, the memory unit 600 may receive a power value from a pulse signal corresponding to the high-frequency signal transferred from the signal generation unit 200 through the relay unit 410 of the sensing unit 400.

The memory unit 600 may store the impedance value calculated by acquiring the electrical stimulation signal generated by the electrical stimulus generation unit 500 and the electrical stimulation signal transferred to and returned from the skin.

The memory unit 600 may store a preset reference pressure value that will be compared with the pressure input through the sensor unit 130 according to the movement of the electrode assembly 110.

For example, the memory unit 600 may store pressure information input from the sensor unit 130 according to the movement of the electrode assembly 110. At this point, the memory unit 600 may store a reference pressure value that will be compared with the pressure input through the sensor unit 130 according to the movement of the electrode assembly 110.

In addition, the memory unit 600 may store movement information sensed according to the movement of the signal transfer unit 100. At this point, the memory unit 600 may store a preset angular velocity or acceleration that will be compared with an acceleration or an angular velocity input through the sensor unit 130 according to the movement of the signal transfer unit 100.

Hereinafter, the operation method (S10) of the high-frequency energy transfer device according to an embodiment of the present invention will be described in detail. Here, contents overlapped with the description of the high-frequency energy transfer device according to an embodiment of the present invention described above may be omitted or simplified.

FIG. 7 is a flowchart illustrating an operation method (S10) of a high-frequency energy transfer device according to an embodiment of the present invention.

Referring to FIG. 7, the operation method (S10) of the high-frequency energy transfer device may include the step of acquiring an input of a pulse signal through the control unit 300 so that the signal generation unit 200 may generate a high-frequency signal (S100).

The operation method (S10) of the high-frequency energy transfer device may include the step of determining whether the acquired input is a first mode (S200). The first mode determination step (S200) may be performed by the control unit 300.

The operation method (S10) of the high-frequency energy transfer device may include the step of determining whether the acquired input is a second mode (S300). The second mode determination step (S300) may be performed by the control unit 300.

When the acquired input is not a first or second mode, the control unit 300 may terminate the operation method (S10) of the high-frequency energy transfer device.

The first mode may be a mode for generating a high-frequency signal corresponding to the pulse signal input only for a specific time period through the signal generation unit 200.

The second mode may be a mode for repeatedly generating a high-frequency signal corresponding to the pulse signal input through the signal generation unit 200 without a specific time limit. The second mode may be continuously maintained when movement of the signal transfer unit 100 or the electrode assembly 110 is sensed.

The operation method (S10) of the high-frequency energy transfer device may include an individual mode execution step (S400). At the individual mode execution step (S400), the sensor unit 130 may control the signal generation unit 200 to perform the individual mode.

FIG. 8 is a flowchart illustrating an individual mode execution step (S400) according to an embodiment of the present invention.

Referring to FIG. 8, the individual mode execution step (S400) may include a high-frequency generation unit operating step (S410) according to a selection mode. Here, the high-frequency generation unit operating step (S410) may be performed by the control unit 300.

The individual mode execution step (S400) may include a pressure sensing step (S420). The pressure sensing step (S420) may acquire pressure information input through the sensor unit 130 as the electrode assembly 110 moves.

The individual mode execution step (S400) may include a measured pressure determination step (S430). At the measured pressure determination step (S430), the sensor unit 130 may sense a pressure that is input as the electrode assembly 110 moves, and determine whether the sensed pressure is equal to or higher than a preset reference pressure. The preset pressure may mean a pressure as high as to maintain the contact state between the skin, to which the high-frequency signal is transferred, and the electrode assembly 110.

The individual mode execution step (S400) may include a high-frequency generation unit operation termination step (S440). At the high-frequency generation unit operation termination step (S440), the sensor unit 130 may terminate the operation of the signal generation unit 200. When the sensed pressure is lower than a preset value, the sensor unit 130 may perform the high-frequency generation unit operation termination step (S440). After the high-frequency generation unit operation termination step (S440), the sensor unit 130 may perform the pressure sensing step (S420).

The individual mode execution step (S400) may include a termination reason generation determination step (S450). The termination reason generation determination step (S450) may be performed through the sensor unit 130. When it is determined that a reason for terminating the individual mode execution step (S400) is generated, the sensor unit 130 may terminate the individual mode execution step (S400). The reason for terminating the individual mode execution step (S400) may be, for example, a case in which input pressure increases rapidly, a case in which the pressure sensed through the measured pressure determination step (S430) decreases after the sensed pressure is determined to be higher than or equal to a preset reference pressure, and a pressure sensed after a predetermined time period does not increase to be higher than or equal to the preset reference pressure, or a case in which a termination input is acquired. When it is determined that a reason for terminating the individual mode execution step (S400) is not generated, the high-frequency generation unit operating step (S410) may be performed according to a selection mode.

FIG. 9 is a flowchart illustrating an individual mode execution step according to another embodiment of the present invention.

The flowchart shown in FIG. 9 may illustrate an embodiment different from the flowchart shown in FIG. 8.

Referring to FIG. 9, the individual mode execution step (S400) may include a high-frequency generation unit operating step (S410) according to a selection mode. The high-frequency generation unit operating step (S410) may be performed by the control unit 300.

The individual mode execution step (S400) may include a handpiece movement sensing step (S420). The handpiece movement sensing step (S420) may acquire movement information input through the sensor unit 130 as the signal transfer unit 100 moves. Here, the input movement information of the signal transfer unit 100 may be an angular velocity and an acceleration of the signal transfer unit 100 that can be sensed when the signal transfer unit 100 moves.

The individual mode execution step (S400) may include a measured angular velocity determination step (S430). At the measured angular velocity determination step (S430), the sensor unit 130 may measure an angular velocity that is input as the signal transfer unit 100 moves, and determine whether the measured angular velocity is equal to or higher than a preset angular velocity. The preset angular velocity may mean an angular velocity as high as to maintain the contact state between the skin, to which the high-frequency signal is transferred, and the electrode assembly 110. When the angular velocity measured at the angular velocity determination step (S430) is lower than the preset angular velocity, it may mean that the skin maintains the contact state with the electrode assembly 110.

The individual mode execution step (S400) may include a measured acceleration determination step (S440). At the measured acceleration determination step (S440), the sensor unit 130 may measure an acceleration that is input as the signal transfer unit 100 moves, and determine whether the measured acceleration is equal to or higher than a preset acceleration. The preset acceleration may mean an acceleration of moving the signal transfer unit 100 as much as a predetermined degree. When the acceleration measured at the acceleration determination step (S440) is lower than the preset acceleration, it may mean that the signal transfer unit 100 is not moved as much as the predetermined degree after the high-frequency signal is supplied for a specific period while the signal transfer unit 100 in contact with the skin.

The individual mode execution step (S400) may include a high-frequency generation unit operation termination step (S450). At the high-frequency generation unit operation termination step (S450), the sensor unit 130 may terminate the operation of the signal generation unit 200. When the measured angular velocity is higher than a preset angular velocity and the measured acceleration is higher than a preset angular velocity, the sensor unit 130 may perform the high-frequency generation unit operation termination step (S450). After the high-frequency generation unit operation termination step (S450), the sensor unit 130 may perform again the signal transfer unit movement sensing step (S420).

The individual mode execution step (S400) may include a termination reason generation determination step (S460). The termination reason generation determination step (S460) may be performed by the sensor unit 130. When it is determined that a reason for terminating the individual mode execution step (S400) is generated, the sensor unit 130 may terminate the individual mode execution step (S400).

The reason for terminating the individual mode execution step (S400) may be, for example, a case in which the measured angular velocity or acceleration increases rapidly, a case in which an angular velocity measured after a predetermined time period, after determining that the angular velocity measured through the angular velocity determination step (S430) is lower than the preset angular velocity, is lower than the preset angular velocity, a case in which the acceleration measured even after a predetermined time period, after determining that the acceleration measured through the acceleration determination step is lower than the preset acceleration (S440), is lower than the preset acceleration, or a case in which a termination input is acquired. When it is determined that a reason for terminating the individual mode execution step (S400) is not generated, the signal generation unit operating step (S410) may be performed according to a selection mode.

Accordingly, through the high-frequency energy transfer device of the present invention, the electrode assembly 110 of the signal transfer unit 100 may stably transfer a high-frequency signal while maintaining continuous contact with the skin, and the electrode assembly 110 may be prevented from being spaced apart from the skin.

Particularly, in the present invention in which the high-frequency signal is supplied through the second mode of the high-frequency energy transfer device, when a high-frequency signal is repeatedly supplied a plurality of times with the period and power of supplying the high-frequency signal the same as those of the high-frequency signal corresponding to the input pulse signal, the high-frequency signal may be stably transferred while reducing the treatment time by determining whether the signal transfer unit 100 has moved in the process of repeatedly supplying the high-frequency signal after the high-frequency signal corresponding to the pulse signal is supplied.

The description of the present invention described above is for illustrative purposes, and those skilled in the art may understand that it can be easily modified into other specific forms without changing the technical spirit or essential features of the present invention. Therefore, it should be understood that the embodiments described above are illustrative in all respects, and not restrictive. For example, each component described as a single type may be implemented in a distributed form, and components described as distributed may also be implemented in a combined form likewise.

The scope of the present invention is indicated by the claims described below, and all changes or modifications derived from the meaning and scope of the claims and their equivalent concepts should be construed as being included in the scope of the present invention.

INDUSTRIAL APPLICABILITY

The present invention may be applied to industrially available high-frequency energy transfer devices.

The invention claimed is:

1. A high-frequency energy transfer device, comprising:
a signal transfer unit including an electrode assembly and configured to transfer a signal to a skin through the electrode assembly, the electrode assembly including:
an electrode including a plurality of central axes intersecting with each other on one side of the electrode assembly configured to be in contact with the skin, the electrode being configured to be applied with a signal having at least one frequency according to at least one skin care type, and
a dielectric material disposed on one side and another side of the electrode; and
a housing having the signal transfer unit therein,
wherein the electrode assembly further includes:
a conductive plate;
a non-conductive assembly disposed on the dielectric material corresponding to the electrode disposed on the conductive plate, the non-conductive assembly being positioned under the electrode; and
a non-conductive plate positioned on a top of the electrode and the dielectric material, having a shape rotated by a predetermined angle with respect to a shape of the dielectric material, and having an area greater than an area of the dielectric material.

2. The high-frequency energy transfer device according to claim 1, wherein the plurality of central axes intersect with each other to divide the dielectric material into a plurality of quadrants with respect to the electrode.

3. The high-frequency energy transfer device according to claim 1,
wherein the electrode includes a first electrode and a second electrode, each of the first electrode and the second electrode being a central axis of the non-conductive plate,
wherein the first electrode is disposed to cross an inside of the conductive plate to receive a first signal, and the second electrode is disposed to cross the inside of the conductive plate and intersect with the first electrode to receive a second signal having a period same as or different from a period of the first signal applied to the first electrode.

4. The high-frequency energy transfer device according to claim 3,
wherein each of the first electrode and the second electrode includes a plurality of signal application units disposed at both ends thereof,
wherein the first electrode and the second electrode are configured to receive the first signal and second signal applied to the plurality of signal application units, respectively, and maintain magnitude of the signal transferred to the dielectric material to be higher than a threshold value.

5. The high-frequency energy transfer device according to claim 2, further comprising a signal generator configured to generate the signal having the at least one frequency to be applied to the electrode.

6. The high-frequency energy transfer device according to claim 5, wherein the signal generator includes a first signal generator configured to generate a first signal having the at least one frequency, and a second signal generator configured to generate a second signal having a period same as or different from a period of the first signal.

7. The high-frequency energy transfer device according to claim 5, further comprising a sensor unit configured to sense a pressure that is input as the electrode assembly moves while being in contact with the skin.

8. The high-frequency energy transfer device according to claim 7, wherein the sensor unit is configured to sense the pressure that is input as the electrode assembly moves while being in contact with the skin, and apply, when the input pressure is higher than a preset reference pressure value, a trigger signal to the signal generator, and the signal generator is configured to generate the signal having the at least one frequency according to whether the trigger signal is applied.

* * * * *